(12) United States Patent
Shu

(10) Patent No.: US 10,498,985 B2
(45) Date of Patent: Dec. 3, 2019

(54) IMAGE PICKUP APPARATUS PERFORMING PHOTOMETRY WITH IMAGE PICKUP DEVICE, IMAGE PICKUP DEVICE, CONTROL METHOD FOR IMAGE PICKUP APPARATUS, AND CONTROL METHOD FOR IMAGE PICKUP DEVICE

(71) Applicant: CANON KABUSHIKI KAISHA, Tokyo (JP)

(72) Inventor: Takayuki Shu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/942,889

(22) Filed: Apr. 2, 2018

(65) Prior Publication Data
US 2018/0302580 A1 Oct. 18, 2018

(30) Foreign Application Priority Data
Apr. 14, 2017 (JP) .................... 2017-080709

(51) Int. Cl.
H04N 5/355 (2011.01)
H04N 5/235 (2006.01)
H04N 5/353 (2011.01)
H04N 5/225 (2006.01)
(Continued)

(52) U.S. Cl.
CPC ......... *H04N 5/3559* (2013.01); *H04N 5/2256* (2013.01); *H04N 5/2351* (2013.01); *H04N 5/2354* (2013.01); *H04N 5/23245* (2013.01); *H04N 5/353* (2013.01); *H04N 5/37452* (2013.01)

(58) Field of Classification Search
CPC ............... H04N 5/2256; H04N 5/2354; H04N 5/335–35581; H01L 27/146–14698
See application file for complete search history.

(56) References Cited

U.S. PATENT DOCUMENTS

2010/0165167 A1* 7/2010 Sugiyama ............ H04N 5/3597
348/311
2013/0016249 A1* 1/2013 Mine .................... H04N 5/2351
348/223.1
(Continued)

*Primary Examiner* — Paul M Berardesca
(74) *Attorney, Agent, or Firm* — Rossi, Kimms & McDowell LLP

(57) ABSTRACT

An image pickup apparatus is capable of reducing saturation of a photoelectric conversion part at a time of photometry. The image pickup apparatus includes a photographing lens and an image pickup device including the following units. A photoelectric conversion part generates an electric charge by converting incident light through the lens photoelectrically and can accumulate the generated electric charge. A transfer switch transfers the electric charge to a charge accumulation part from the photoelectric conversion part. A control unit selectively sets a driving mode from among a first driving mode in which the electric charge generated by the photoelectric conversion part is intermittently transferred to the charge accumulation part by switching ON/OFF of the transfer switch and a second driving mode in which the electric charge generated by the photoelectric conversion part is continuously transferred to the charge accumulation part by keeping an ON state of the transfer switch.

9 Claims, 14 Drawing Sheets

(51) Int. Cl.
*H04N 5/232* (2006.01)
*H04N 5/3745* (2011.01)

(56) References Cited

U.S. PATENT DOCUMENTS

2015/0264244 A1    9/2015   Ichikawa et al.
2018/0063401 A1*   3/2018   Kobuse ................ H04N 5/2353

* cited by examiner

IMAGE PICKUP APPARATUS PERFORMING PHOTOMETRY WITH IMAGE PICKUP DEVICE, IMAGE PICKUP DEVICE, CONTROL METHOD FOR IMAGE PICKUP APPARATUS, AND CONTROL METHOD FOR IMAGE PICKUP DEVICE

BACKGROUND OF THE INVENTION

Field of the Invention

The present invention relates to an image pickup apparatus, an image pickup device, a control method for the image pickup apparatus, and a control method for the image pickup device, and in particular, relates to technique performing photometry using an image pickup device.

Description of the Related Art

When obtaining one frame that constitutes a still image or a video image, an image pickup apparatus equipped with a CMOS sensor achieves a global electronic shutter by accumulating electric charges occurred by photoelectric conversion to photoelectric conversion parts and transferring the electric charges from the photoelectric conversion parts to accumulation parts simultaneously for all pixels. For example, United States Patent Application 20150264244A1 proposes a technique that optimizes a ratio of a saturation charge amount of a photoelectric conversion part to a saturation charge amount of a charge accumulation part according to timing of transferring an electric charge to the charge accumulation part in a charge accumulation period and that reduces pixel size while increasing the saturation charge amount.

However, the technique disclosed in the above-mentioned application may cause saturation of the photoelectric conversion part because of delay of charge transfer from the photoelectric conversion part to a charge accumulation part when sudden bright light like reflected flash light (reflected light from an object at a time of electronic flash emission) is received. Moreover, since controllable unit time is restricted in a case of performing charge transfer multiple times during photoelectric conversion, a desired high-luminance limit of photometry may not be attained. Photometry of object luminance using such a CMOS sensor as a photometry sensor lowers accuracy of a photometry value calculated. For example, an object distance (distance from an image pickup device to an object) is unknown at a time of photometry of the reflected flash light. Accordingly, when an electronic flash device emits light of a predetermined emission amount, the photoelectric conversion part may be saturated by the reflected flash light because of a short object distance. Thus, the lowered photometry accuracy may disable appropriate calculation of a flash emission amount for main photographing, which disables flash photographing in correct exposure.

SUMMARY OF THE INVENTION

The present invention provides an image pickup apparatus, an image pickup device, a control method for the image pickup apparatus, and a control method for the image pickup device, which are capable of reducing saturation of a photoelectric conversion part at a time of photometry.

Accordingly, a first aspect of the present invention provides an image pickup apparatus including a photographing lens and an image pickup device that includes a photoelectric conversion part configured to generate an electric charge by converting incident light through the photographing lens photoelectrically and to be able to accumulate the generated electric charge, a charge accumulation part configured to hold the electric charge transferred from the photoelectric conversion part, a transfer switch configured to transfer the electric charge to the charge accumulation part from the photoelectric conversion part, and a controller configured to selectively set a driving mode from among a first driving mode in which the electric charge generated by the photoelectric conversion part is intermittently transferred to the charge accumulation part by switching ON and OFF of the transfer switch and a second driving mode in which the electric charge generated by the photoelectric conversion part is continuously transferred to the charge accumulation part by keeping an ON state of the transfer switch.

Accordingly, a second aspect of the present invention provides an image pickup device including a photoelectric conversion part configured to generate an electric charge by converting incident light photoelectrically and to be able to accumulate the generated electric charge, a charge accumulation part configured to hold the electric charge transferred from the photoelectric conversion part, a transfer switch configured to transfer the electric charge to the charge accumulation part from the photoelectric conversion part, and a controller configured to selectively set a driving mode from among a first driving mode in which the electric charge generated by the photoelectric conversion part is intermittently transferred to the charge accumulation part by switching ON and OFF of the transfer switch and a second driving mode in which the electric charge generated by the photoelectric conversion part is continuously transferred to the charge accumulation part by keeping an ON state of the transfer switch.

Accordingly, a third aspect of the present invention provides a control method for an image pickup apparatus equipped with an image pickup device including a photoelectric conversion part that generates an electric charge by converting incident light photoelectrically and is able to accumulate the generated electric charge, a charge accumulation part that holds the electric charge transferred from the photoelectric conversion part, and a transfer switch that transfers the electric charge to the charge accumulation part from the photoelectric conversion part, the control method including setting a driving mode from among a first driving mode and a second driving mode selectively, transferring the electric charge generated by the photoelectric conversion part to the accumulation part intermittently by switching ON and OFF of the transfer switch in the first driving mode, and transferring the electric charge generated by the photoelectric conversion part to the accumulation part continuously by keeping an ON state of the transfer switch in the second driving mode.

Accordingly, a fourth aspect of the present invention provides a control method for an image pickup device that includes a photoelectric conversion part that generates an electric charge by converting incident light photoelectrically and is able to accumulate the generated electric charge, a charge accumulation part that holds the electric charge transferred from the photoelectric conversion part, and a transfer switch that transfers the electric charge to the charge accumulation part from the photoelectric conversion part, the control method including setting a driving mode from among a first driving mode and a second driving mode selectively, transferring the electric charge generated by the photoelectric conversion part to the accumulation part intermittently by switching ON and OFF of the transfer switch in the first driving mode, and transferring the electric charge generated by the photoelectric conversion part to the accumulation part continuously by keeping an ON state of the transfer switch in the second driving mode.

According to the present invention, the saturation of the photoelectric conversion section of the image pickup device is reduced at the time of photometry.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
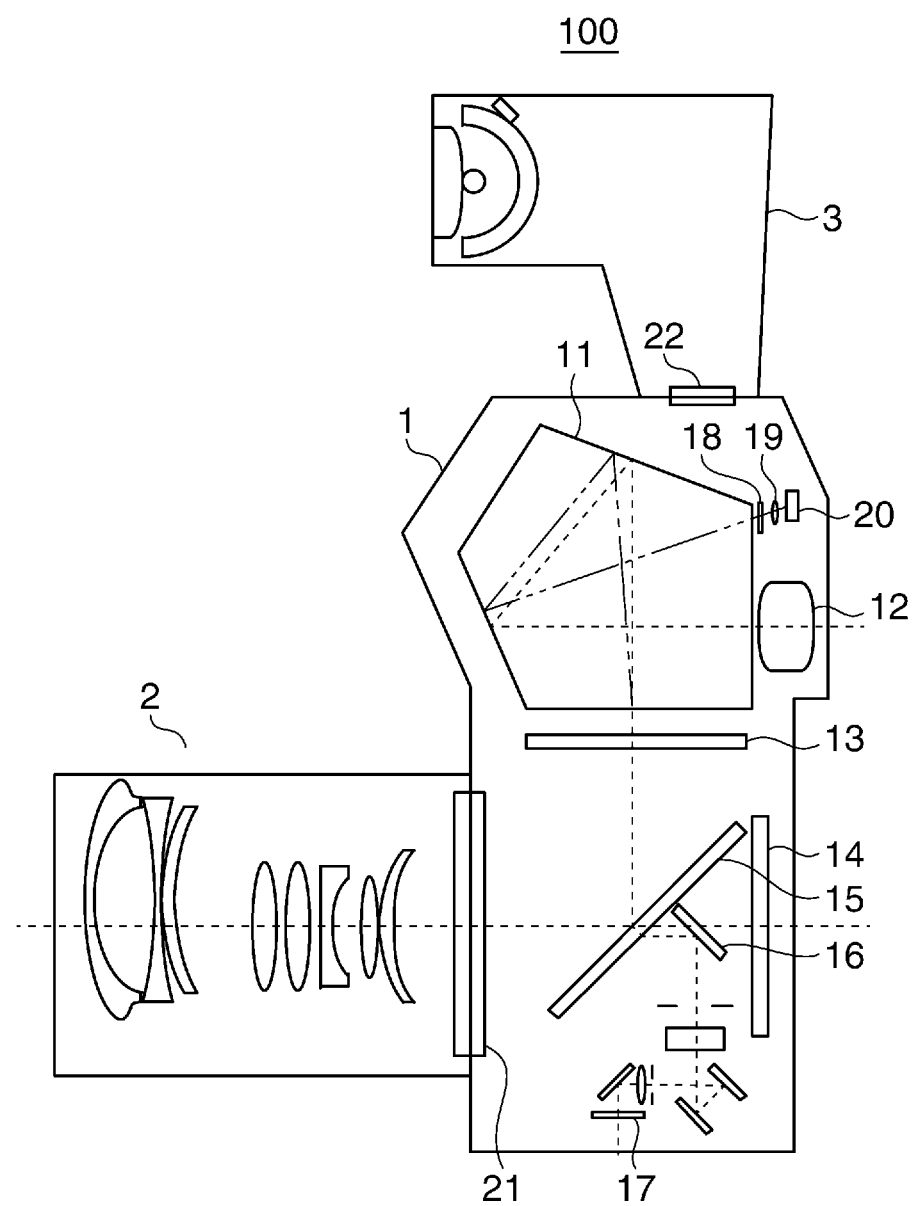
FIG. 1 is a sectional view schematically showing a common configuration of an image pickup apparatus according to embodiments of the present invention.

First, a first embodiment of the present invention will be described. FIG. 1 is a sectional view schematically showing a common configuration of an image pickup apparatus according to embodiments of the present invention. Specifically, the image pickup apparatus 100 is a digital single lens reflex camera, and has a camera body 1, a photographing lens 2, and an electronic flash device (a light emission device) 3. The photographing lens 2 and the electronic flash device 3 are attachable to the camera body 1 at predetermined positions and are detachable therefrom. Since well-known configurations are applicable to the photographing lens 2 and the electronic flash device 3, detailed descriptions thereof are omitted.

The camera body 1 is provided with a lens mount 21 for detaching and attaching the photographing lens 2, and an accessory shoe 22 for detaching and attaching the electronic flash device 3. A main mirror 15 and a sub mirror 16 that constitute a quick-return-mirror mechanism are arranged in the camera body 1. As shown in FIG. 1, the main mirror 15 and the sub mirror 16 are positioned in a photographing light path during an AF (automatic focus) process and an AE (automatic exposure) process to an object. Most of light flux from the object that enters into the camera body 1 through the photographing lens 2 is reflected by the main mirror 15 toward a finder screen 13 and forms an object image on the finder screen 13 during the AF/AE process. A photographer is able to observe the image through a pentagonal prism 11 and an eyepiece lens 12. Moreover, a part of light flux that enters into the pentagonal prism 11 forms an image on a photometry sensor 20 through an optical filter 18 and an imaging lens 19. Furthermore, light flux that transmits the main mirror 15 is reflected by the sub mirror 16 and is guided to an AF sensor 17. The main mirror 15 and the sub mirror 16 leap up toward the finder screen 13 and retract from the photographing light path at photographing, which allows the incident light flux to form an object image on an image sensor 14 and to expose the sensor 14 with the object image.

Figure 2:
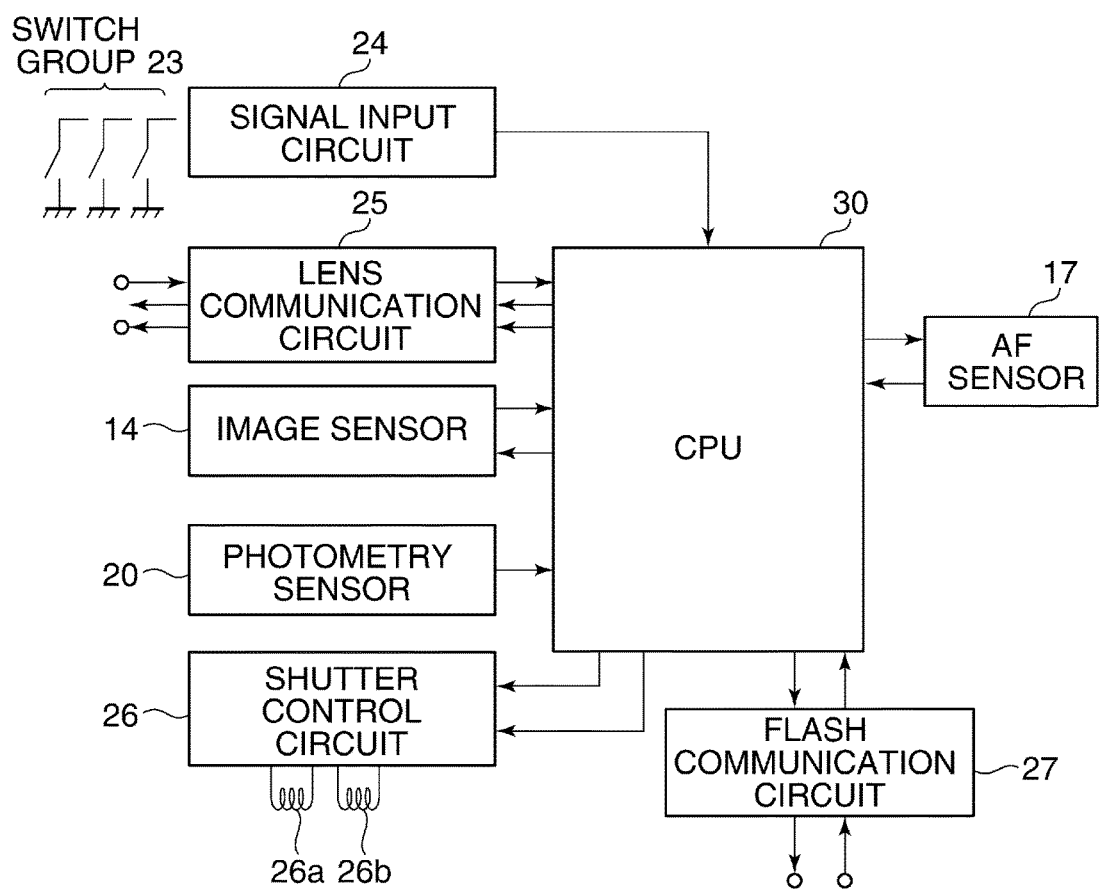
FIG. 2 is a block diagram schematically showing a hardware configuration of a camera body constituting the image pickup apparatus in FIG. 1.

FIG. 2 is a block diagram schematically showing a hardware configuration of the camera body 1. The camera body 1 is provided with the image sensor (image pickup device) 14, the AF sensor 17, the photometry sensor 20, a switch group 23, a signal input circuit 24, a lens communication circuit 25, a shutter control circuit 26, a flash communication circuit 27, and a CPU 30. The image sensor 14, such as a well-known CMOS sensor and a CCD sensor, converts an optical image formed on an image pickup surface into an electrical signal and generates an image signal. The switch group 23, which includes a release button, a dial, etc., is operated by a user and gives various instructions to the CPU 30 according to user's operations. The signal input circuit 24 detects operations to the switch group 23 from outside.

The lens communication circuit 25 communicates with the photographing lens 2 through the lens mount 21, and controls a focusing lens and diaphragm of the photographing lens 2. The shutter control circuit 26 controls shutter magnets 26a and 26b. The flash communication circuit 27 communicates with the electronic flash device 3 through the accessory shoe 22, and controls an emission timing and emission amount of the electronic flash device 3. The CPU 30 is a microcomputer that controls the entire image pickup apparatus 100 by running a predetermined program stored in a built-in memory. For example, the CPU 30 detects object luminance by controlling the photometry sensor 20, and determines an aperture value of the photographing lens 2 and shutter speed. Moreover, the CPU 30 controls the aperture value in the photographing lens 2 through the lens communication circuit 25, and controls energizing times of the shutter magnets 26a and 26b through the shutter control circuit 26. Furthermore, the CPU 30 controls the image sensor 14 so as to photograph. Since a configuration and method for generating image data from the electrical signal output from the image sensor 14 and for storing (saving) the image data are well-known, their descriptions are omitted.

Figure 3A:
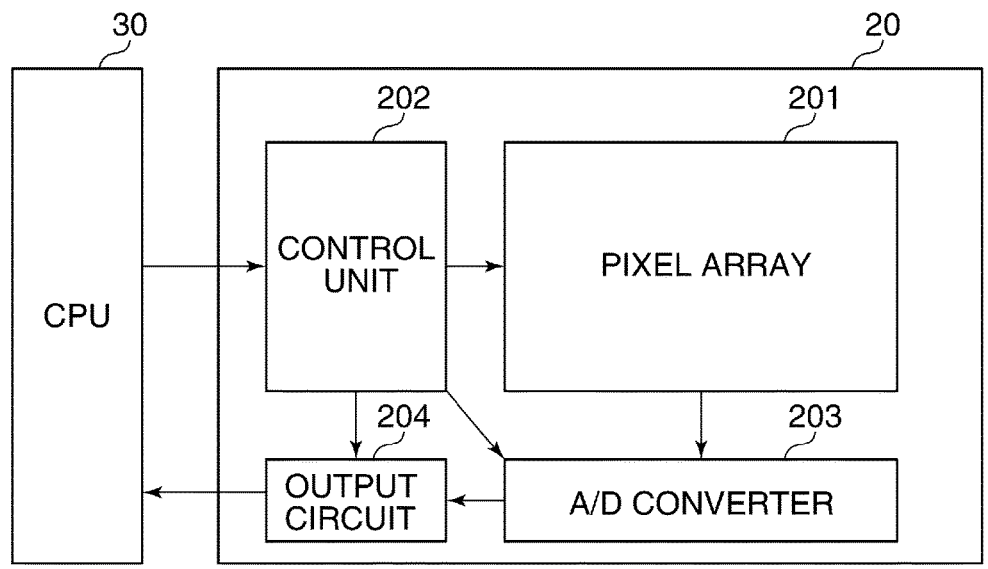
FIG. 3A is a block diagram showing an internal configuration of a photometry sensor provided in the camera body shown in FIG. 2.

FIG. 3A is a block diagram showing an internal configuration of the photometry sensor 20. The photometry sensor 20 is an image pickup device that has a pixel array 201, a control unit 202, an A/D converter 203, and an output circuit 204. The control unit 202 is connected with the CPU 30 and controls the blocks of the photometry sensor 20 according to a control instruction from the CPU 30. The control unit 202 has flag registers, setting registers, and timers for various controls. The pixel array 201 photoelectrically converts the object image and accumulates electric charges generated. An analog signal accumulated in each pixel of the pixel array 201 is converted into digital data by the A/D converter 203. The digital data converted by the A/D converter 203 is output to the CPU 30 through the output circuit 204.

Figure 3B:
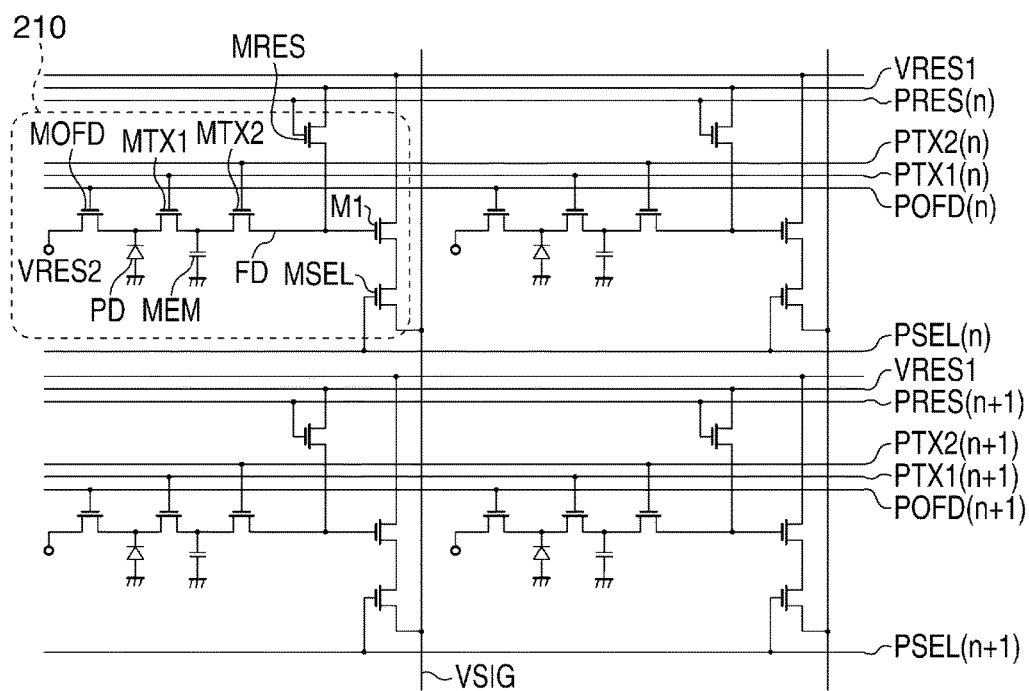
FIG. 3B is a circuit diagram for describing a configuration of a pixel array of the photometry sensor shown in FIG. 3A.

FIG. 3B is a circuit diagram for describing a configuration of the pixel array 201. Although only four pixels 210 are shown in FIG. 3B, the pixel array 201 actually includes more pixels 210. The pixel 210 has a photoelectric conversion part PD (photodiode), a charge accumulation part MEM, an amplifying part M1, a first transfer switch MTX1, and a second transfer switch MTX2. Moreover, the pixel 210 has a reset transistor MRES, a selection transistor MSEL, and a discharge switch MOFD.

The photoelectric conversion part PD accumulates an electric charge generated by incident light. The first transfer switch MTX1 transfers the electric charge generated by the photoelectric conversion part PD to the charge accumulation part MEM. The charge accumulation part MEM holds temporarily the electric charge transferred from the photoelectric conversion part PD. The second transfer switch MTX2 transfers the electric charge in the charge accumulation part MEM to an input node FD (floating diffusion) of the amplifying part M1. The reset transistor MRES resets voltage of the input node FD. The selection transistor MSEL selects the pixel 210 that outputs a signal to an output line VSIG. The amplifying part M1 outputs a signal corresponding to the electric charge that occurs in the photoelectric conversion part PD to the output line VSIG.

The discharge switch MOFD discharges the electric charge in the photoelectric conversion part PD to a power node VRES2. The amplifying part M1 is a source follower, for example. The first transfer switch MTX1, second transfer switch MTX2, and discharge switch MOFD are MOS transistors, respectively. A control line PTX1 is connected to the first transfer switch MTX1. A control line PTX2 is connected to the second transfer switch MTX2. A control line POFD is connected to the discharge switch MOFD. In the first embodiment, the pixels 210 are arranged in a matrix (in a grid), and a common control line is connected to the pixels 210 on one line. For example, the control lines connected to the pixels 210 on an n-th line of the matrix are expressed as a control line POFD(n), control line PTX1($n$), and control line PTX2($n$).

Figure 4A:
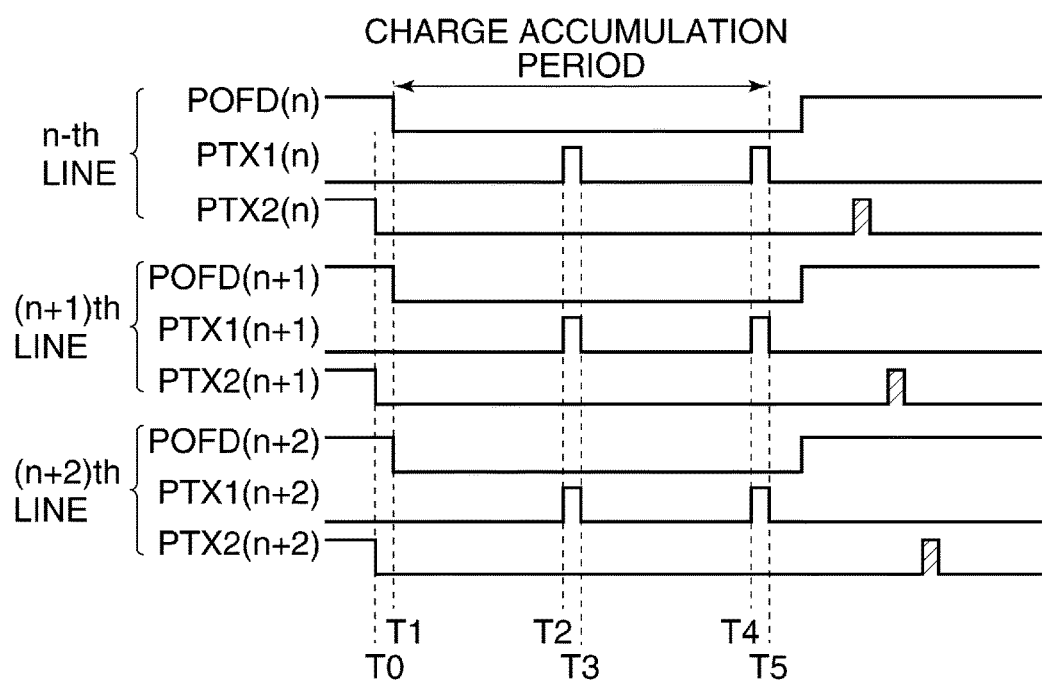
FIG. 4A is a timing chart for describing a first driving mode of the photometry sensor shown in FIG. 3A.

Next, driving modes of the pixel array 201 will be described. FIG. 4A is a timing chart for describing a first driving mode of the pixel array 201. FIG. 4A shows driving pulses supplied to the control line POFD for the discharge switch MOFD, to the control line PTX1 for the first transfer switch MTX1, and to the control line PTX2 for the second transfer switch MTX2 about the pixels 210 on each of the n-th line, (n+1)th line, and the (n+2)th line. A high-level driving pulse turns on a corresponding transistor or switch. And a low-level driving pulse turns off a corresponding transistor or switch. It should be noted that the control unit 202 has logical circuits, such as a shift register and an address decoder, and supplies a driving pulse to the pixel array 201.

The control unit 202 keeps an ON state of the discharge switch MOFD in a period until time T0, so that the photoelectric conversion part PD is reset to the power node VRES2. Moreover, the control unit 202 turns on the second transfer switch MTX2 and the reset transistor MRES, so that the charge accumulation part MEM and the input node FD of the amplifying part M1 are reset to the power node VRES1. The control unit 202 turns off the second transfer switch MTX2 at the time T0, and turns off the discharge switch MOFD at time T1. Thereby, the charge accumulation is started. The first transfer switch MTX1 keeps an OFF state from the time T1 to time T2. The control unit 202 turns on the first transfer switch MTX1 at the time T2, so that the electric charge generated by the photoelectric conversion part PD is transferred to the charge accumulation part MEM. Accordingly, the electric charge generated by the photoelectric conversion part PD from the time T1 to the time T2 is held by the charge accumulation part MEM after the time T2.

The control unit 202 turns off the first transfer switch MTX1 at time T3, and the first transfer switch MTX1 keeps the OFF state from the time T3 to time T4. Accordingly, the electric charge generated by the photoelectric conversion part PD from the time T1 to the time T3 is held by the charge accumulation part MEM, and the electric charge generated by the photoelectric conversion part PD generated from the time T3 to the time T4 is held by the photoelectric conversion part PD. The control unit 202 turns on the first transfer switch MTX1 of the pixel 210 on every line at the time T4, so that the electric charge in the photoelectric conversion part PD is transferred to the charge accumulation part MEM. The control unit 202 turns off the first transfer switch MTX1 of the pixel 210 on every line at time T5, so that a charge accumulation period finishes. Thus, the charge accumulation period that starts at the time T1 and finishes at the time T5 is common for every pixel 210. That is, a global electronic shutter is achieved by the above-mentioned control.

In the first embodiment, the saturation charge amount of the charge accumulation part MEM is designed so as to be about twice of the saturation charge amount of the photoelectric conversion part PD. Accordingly, the electric charge in the photoelectric conversion part PD is transferred to the charge accumulation part MEM at half timing and finish timing of the charge accumulation period. However, the ratio of the saturation charge amounts is not limited to twice. It is enough that the saturation charge amount of the charge accumulation part MEM is larger than the saturation charge amount of the photoelectric conversion part PD. Moreover, the electric charge in the photoelectric conversion part PD may be transferred to the charge accumulation part MEM at two or more times corresponding to the ratio.

Figure 4B:
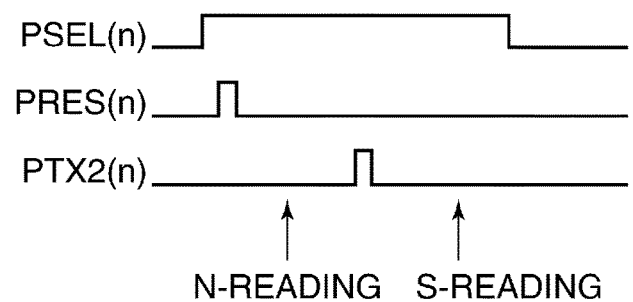
FIG. 4B is a timing chart for describing a signal reading operation from one pixel in an n-th line of the pixel array shown in FIG. 3A.

Next, a signal reading operation from one pixel 210 will be described. FIG. 4B is a timing chart for describing the signal reading operation (a part with slant lines in FIG. 4A) from one pixel 210 on the n-th line. FIG. 4B shows a driving pulse PSEL(n) supplied to the selection transistor MSEL(n), a driving pulse PRES(n) supplied to the reset transistor MRES(n), and a driving pulse supplied to the control line PTX2 for the second transfer switch MTX2.

The control unit 202 turns on the selection transistor MSEL(n) by turning on the driving pulse PSEL(n). Next, the control unit 202 turns on the reset transistor MRES(n) by turning on the driving pulse PRES(n), and resets the input node FD to the power node VRES1. After that, the control unit 202 turns off the reset transistor MRES(n) by turning off the driving pulse PRES(n), so that reset noise and offset voltage of the input node FD are output to the output line VSIG. The control unit 202 A/D-converts this signal as a noise signal N and stores it (N reading). Next, the control unit 202 turns on the second transfer switch MTX2(n) by turning on the driving pulse supplied to the control line PTX2(n). Thereby, the electric charge in the charge accumulation part MEM is transferred to the input node FD. The voltage of the input node FD varies according to the capacity of the input node FD and the amount of the transferred electric charge, and a signal based on the voltage of the input node FD is output to the output line VSIG by the amplifying part M1. The control unit 202 A/D-converts this signal as a light signal S and stores it (S reading).

The output circuit 204 removes the noise signal N from the light signal S and outputs it to the CPU 30. Then, the control unit 202 turns off the selection transistor MSEL(n) by turning off the driving pulse PSEL(n). After the above operation about the pixel 210 on the n-th line, the same operation is performed about the pixel 210 on the (n+1)th line, and the same operation is performed about each of pixels from the pixel 210 on the first line to the pixel 210 on the last line. After the reading about the pixel 210 on the last line, the control unit 202 turns off the first transfer switch MTX1 and second transfer switch MTX2 of every pixel 210.

Figure 5:
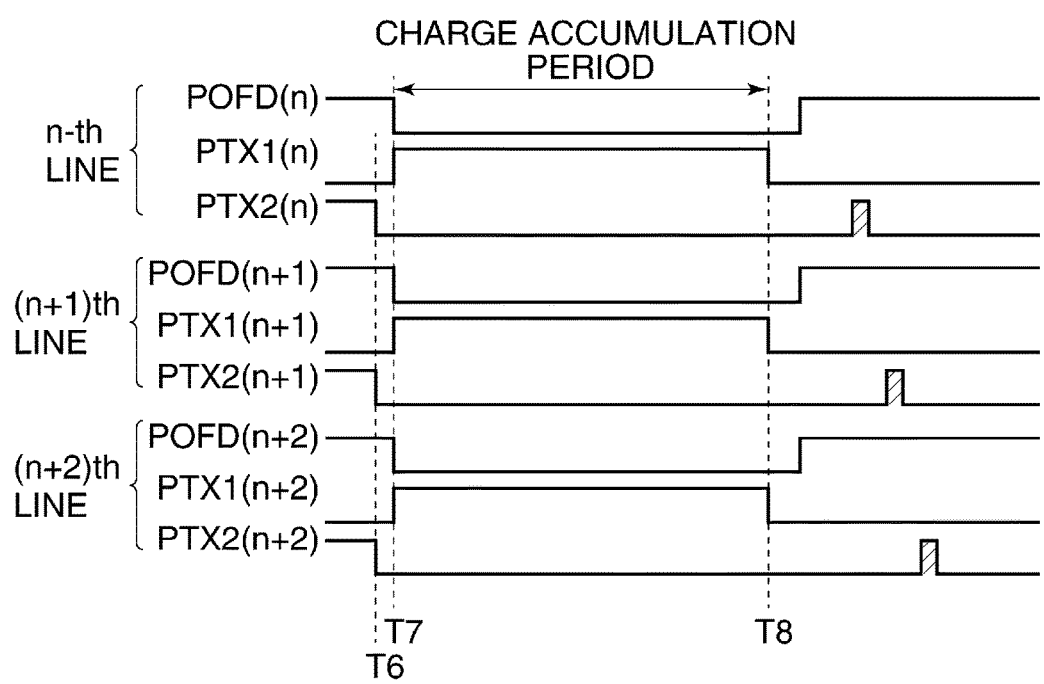
FIG. 5 is a timing chart for describing a second driving mode of the photometry sensor shown in FIG. 3A.

FIG. 5 is a timing chart for describing a second driving mode of the pixel array 201, and is similarly illustrated as FIG. 4A. The control unit 202 keeps the ON state of the discharge switch MOFD in a period until time T6, so that the photoelectric conversion part PD is reset to VRES2. Moreover, the control unit 202 turns on the second transfer switch MTX2 and the reset transistor MRES, so that the charge accumulation part MEM and the input node FD of the amplifying part M1 are reset to the power node VRES1. The control unit 202 turns off the second transfer switch MTX2 at the time T6 and turns off the discharge switch MOFD at time T7, so that the charge accumulation starts. Moreover, the control unit 202 turns on the first transfer switch MTX1 at the time T7. During the period from the time T7 to time T8, the electric charge that occurs in the photoelectric conversion part PD is immediately transferred to the charge accumulation part MEM and is held. The control unit 202 turns off the first transfer switch MTX1 of the pixel 210 on every line at the time T8, so that the charge accumulation period finishes. Thus, the charge accumulation period for every pixel 210 starts at the time T7 and finishes at the time T8. That is, the global electronic shutter is achieved by the above-mentioned control. Since the signal reading operation from one pixel 210 is likened to the above-mentioned description referring to FIG. 4B, the description is omitted.

In the above-mentioned first driving mode, since the electric charge is intermittently transferred by controlling ON/OFF of the first transfer switch MTX1, a period in which the first transfer switch MTX1 keeps the ON state is short. This reduces influence of dark current noise depending on the ON state period of the first transfer switch MTX1, and therefore, the first driving mode is suitable for long-period charge accumulation. However, sudden incidence of large-amount light like reflected flash light may cause saturation of the photoelectric conversion part PD as described below.

In contrast to this, in the second driving mode, the first transfer switch MTX1 keeps the ON state in the charge accumulation period, so that the electric charge generated by the photoelectric conversion part PD is transferred to the charge accumulation part MEM and is held by the charge accumulation part MEM. Since the electric charge generated by the photoelectric conversion part PD is accumulated in the charge accumulation part MEM with a large saturation charge amount, there is a low possibility that sudden incidence of large-amount light like flash light causes saturation as compared with the first driving mode. Since the influence of the dark current noise depending on the ON state period of the first transfer switch MTX1 becomes large, the second driving mode is preferably used for short-period charge accumulation.

Figure 6:
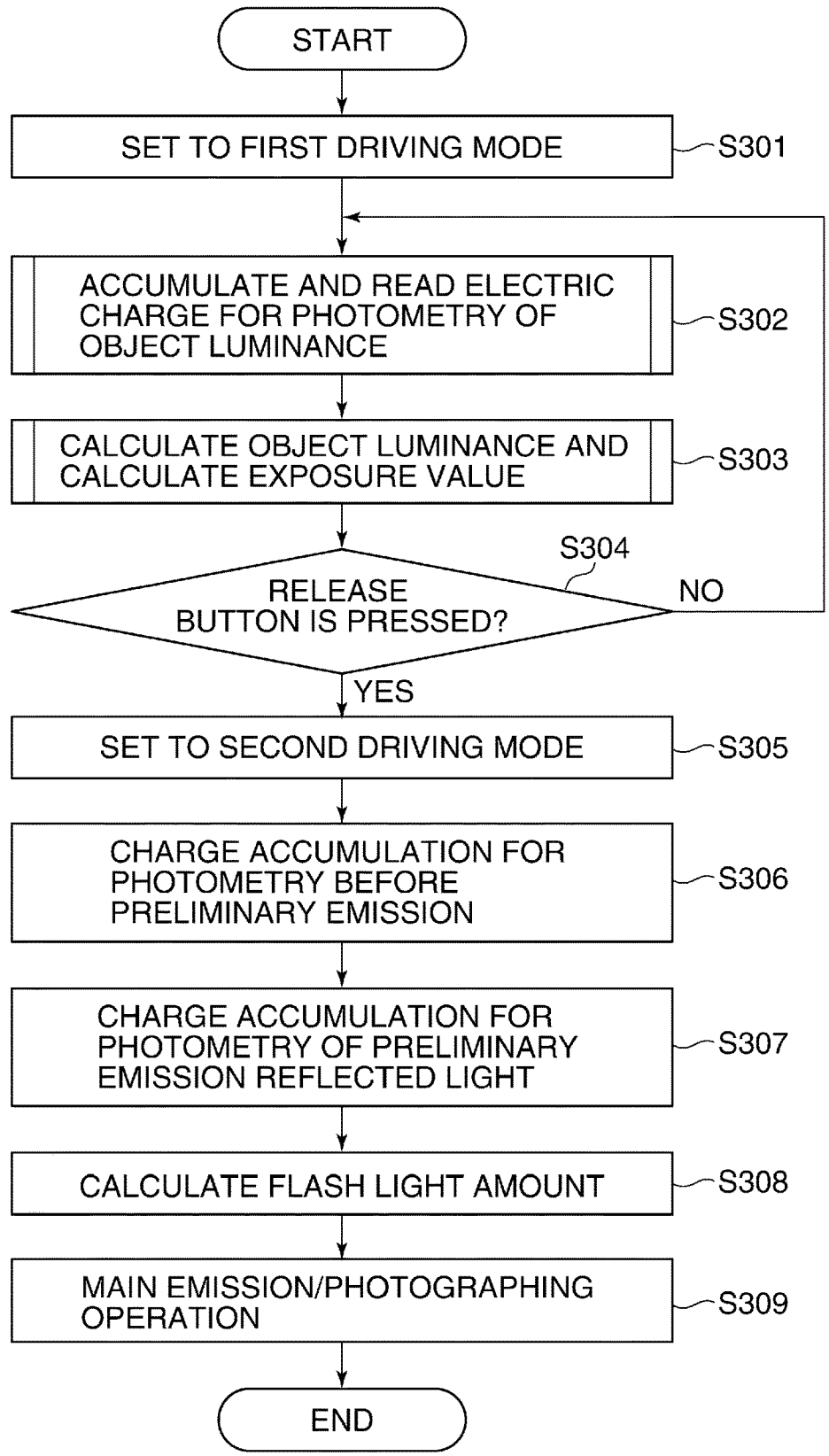
FIG. 6 is a flowchart showing a photographing operation according to a first embodiment in the image pickup apparatus.

Accordingly, exposure is controlled using both the first driving mode and second driving mode in the first embodiment. FIG. 6 is a flowchart showing a photographing operation according to the first embodiment in the image pickup apparatus 100. Each process indicated by an S-number in the flowchart in FIG. 6 is achieved, when the CPU 30 runs a predetermined program and controls operations of parts of the image pickup apparatus 100.

When detecting an instruction to start an AF/AE process to an object, the CPU 30 sets the driving mode of the photometry sensor 20 to the first driving mode in S301. The CPU 30 controls the photometry sensor 20 to accumulate an electric charge and reads the accumulated electric charge as a photometry signal in S302 in order to calculate object luminance without emission of the electronic flash device 3. In S303, the CPU 30 calculates the object luminance on the basis of the photometry signal obtained in S302 and calculates an exposure value, The CPU 30 determines whether the release button provided in the camera body 1 is pressed for a start instruction of main photographing in S304. When determining that the release button is not pressed (NO in S304), the CPU 30 returns the process to S302. When determining that the release button is pressed (YES in S304), the CPU 30 proceeds with the process to S305. It should be noted that the charge accumulation period of the photometry sensor 20 is appropriately set up on the basis of the object luminance calculated recently in a case where the process returns to S302 from S304.

The CPU 30 sets the driving mode of the photometry sensor 20 to the second driving mode in S305. Accordingly, the photometry sensor 20 is driven in the second driving mode in the following S306 and S307. In S306, the CPU 30 controls the photometry sensor 20 to execute a charge accumulation process for photometry before preliminary emission, and reads the accumulated charge as a photometry signal. It should be noted that the charge accumulation process for photometry before preliminary emission is executed for calculating object luminance under extraneous light that is not the light from the electronic flash device 3 by controlling the photometry sensor 20 under the same accumulation condition as the below-mentioned S307 without emission of the electronic flash device 3. The CPU 30 controls the photometry sensor 20 to execute a charge accumulation process for photometry of preliminary emission reflected light in S307. The charge accumulation process for photometry of preliminary emission reflected light is executed for calculating object luminance based on the reflected flash light by controlling the photometry sensor 20 with preliminary emission of the electronic flash device 3. It should be noted that the signal accumulated in the photometry sensor 20 in S307 corresponds to mixture of the reflected flash light and the extraneous light that is not the light from the electronic flash device 3. Although flash emission is generally used for the preliminary emission of the electronic flash device 3, flat emission that keeps emission at a predetermined emission level that is approximately constant may be used.

In S308, the CPU 30 calculates a flash light amount (main emission amount) for main photographing. The main emission amount is calculated on the basis of the photometry signal corresponding to the preliminary emission reflected light that is obtained by removing the photometry signal corresponding to the extraneous light obtained in S306 from the photometry signal corresponding to the mixture obtained in S307. In S309, the CPU 30 controls the electronic flash device 3, the image sensor 14, and the shutter control circuit 26 according to the exposure value calculated in S303 and the main emission amount calculated in S308, and executes the photographing operation with emission of the electronic flash device 3. The CPU 30 finishes this process after the process in S309.

Figure 7A:
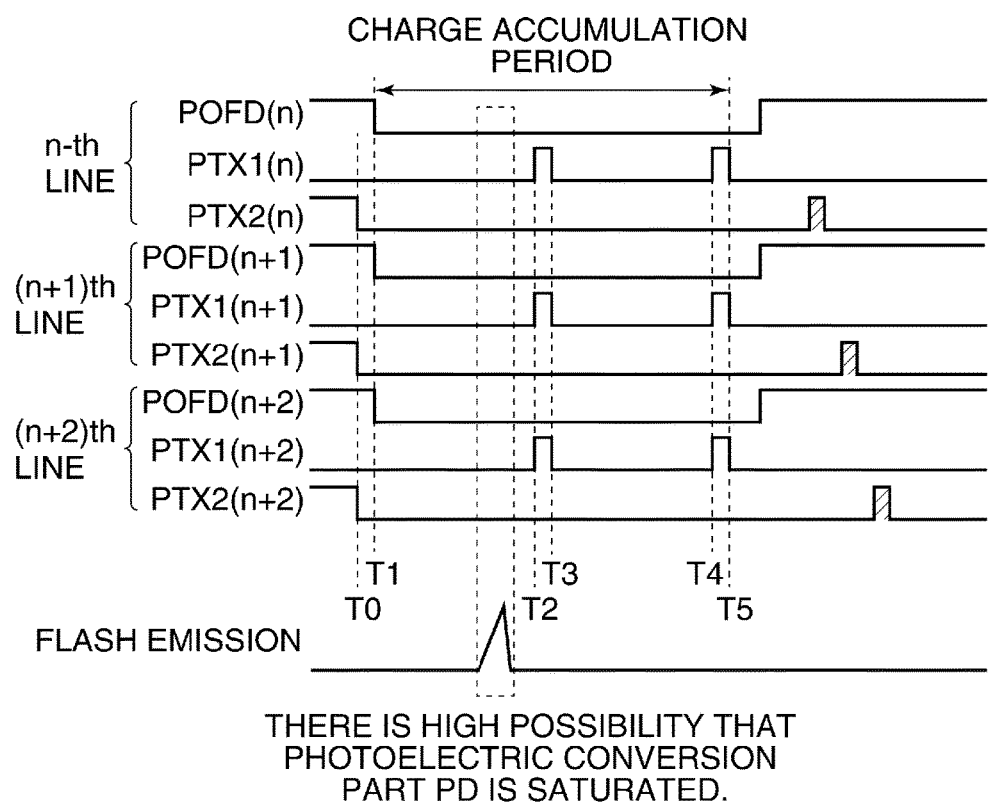
FIG. 7A is a view for describing relation between emission of an electronic flash device and charge accumulation in a case where a process in S307 in FIG. 6 is tentatively executed in the first driving mode.

As described above, the drive of the photometry sensor 20 is controlled in the second driving mode in the charge accumulation process for photometry of preliminary emission reflected light (S307) in the first embodiment. FIG. 7A is a view for describing relation between emission of the electronic flash device 3 and charge accumulation in a case where the process in S307 is tentatively executed in the first driving mode. Generally, a reflected flash light amount increases as distance to an object from the image pickup apparatus 100 decreases. As mentioned above, the saturation charge amount of the photoelectric conversion part PD is a half of the saturation charge amount of the charge accumulation part MEM in the first embodiment. Accordingly, reflected flash light may cause saturation of the photoelectric conversion part PD. This disables to accumulation of the total electric charge needed to accumulate.

Figure 7B:
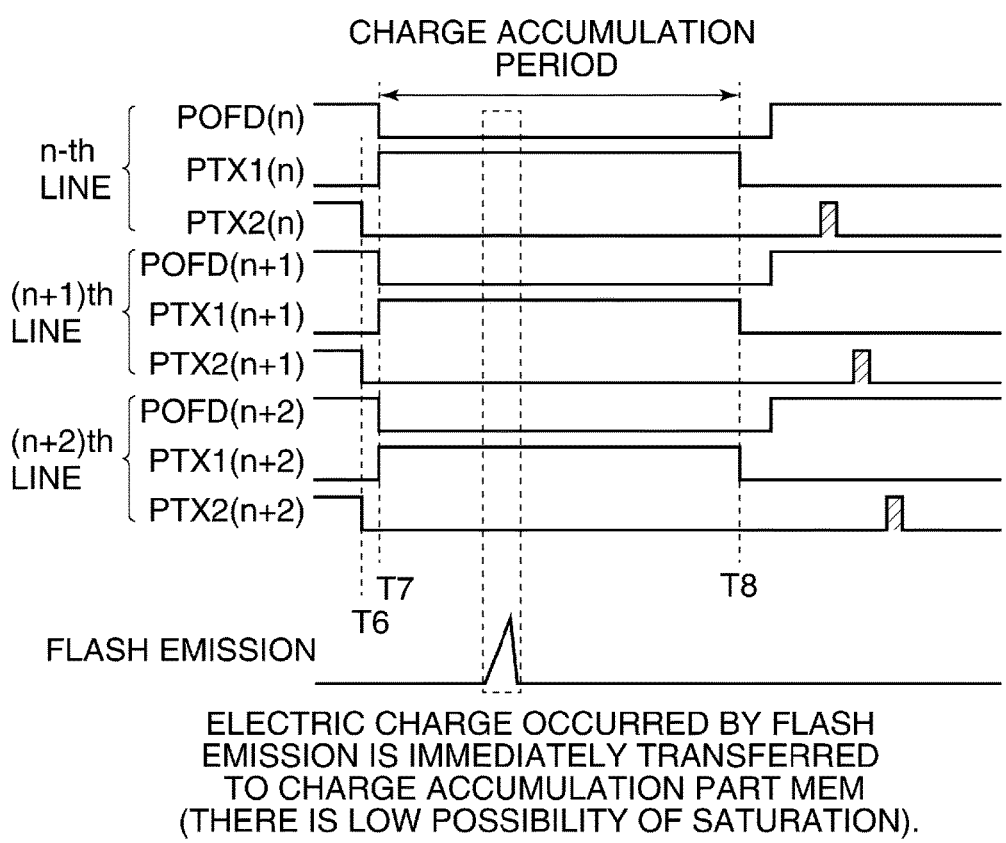
FIG. 7B is a view for describing relation between emission of the electronic flash device and charge accumulation in a case where the process in S307 is executed in the second driving mode.

In the meantime, the electric charge that occurs in the photoelectric conversion part PD is immediately transferred to the charge accumulation part MEM, and is accumulated in the charge accumulation part MEM in the second driving mode. FIG. 7B is a view for describing relation between emission of the electronic flash device 3 and charge accumulation in a case where the process in S307 is executed in the second driving mode. Since the saturation charge amount in this case is determined by the charge accumulation part MEM, the total electric charge that occurs due to the reflected flash light is accumulated in the charge accumulation part MEM. Moreover, since it is enough to accumulate the electric charge during the emission of the electronic flash device 3, the charge accumulation period in S307 is shorter than the charge accumulation period in S302. Accordingly, even if the electric charge is accumulated in the second driving mode, the influence of the dark current noise depending on the period in which the first transfer switch MTX1 keeps ON is small. Furthermore, the photometry sensor 20 is controlled in the second driving mode also in S306 in which the electronic flash device 3 does not emit light. This enables calculation of the flash light amount for photographing in higher accuracy by removing the influence of the extraneous light that is not light from the electronic flash device 3.

As mentioned above, in the first embodiment, the drive of the photometry sensor 20 is controlled in the first driving mode in the case of the charge accumulation (S302) for finding for the object luminance without emission of the electronic flash device 3, and a long charge accumulation period is set up for a small object luminance. This reduces influence of dark current noise depending on the ON state period of the first transfer switch MTX1. In the meantime, when the electronic flash device 3 is emitted, the photometry sensor 20 is driven in the second driving mode in which the electric charge that occurs in the photoelectric conversion part PD is immediately transferred to the charge accumulation part MEM, and it drives by the second driving mode which accumulates an electric charge in the charge accumulation part MEM. This reduces possibility that the reflected flash light causes saturation of electric charge in the pixel 210. And accordingly, the flash photographing in suitable main emission amount becomes available because the photometry accuracy increases, which enables to obtain a high-quality photographing image.

Figure 8:
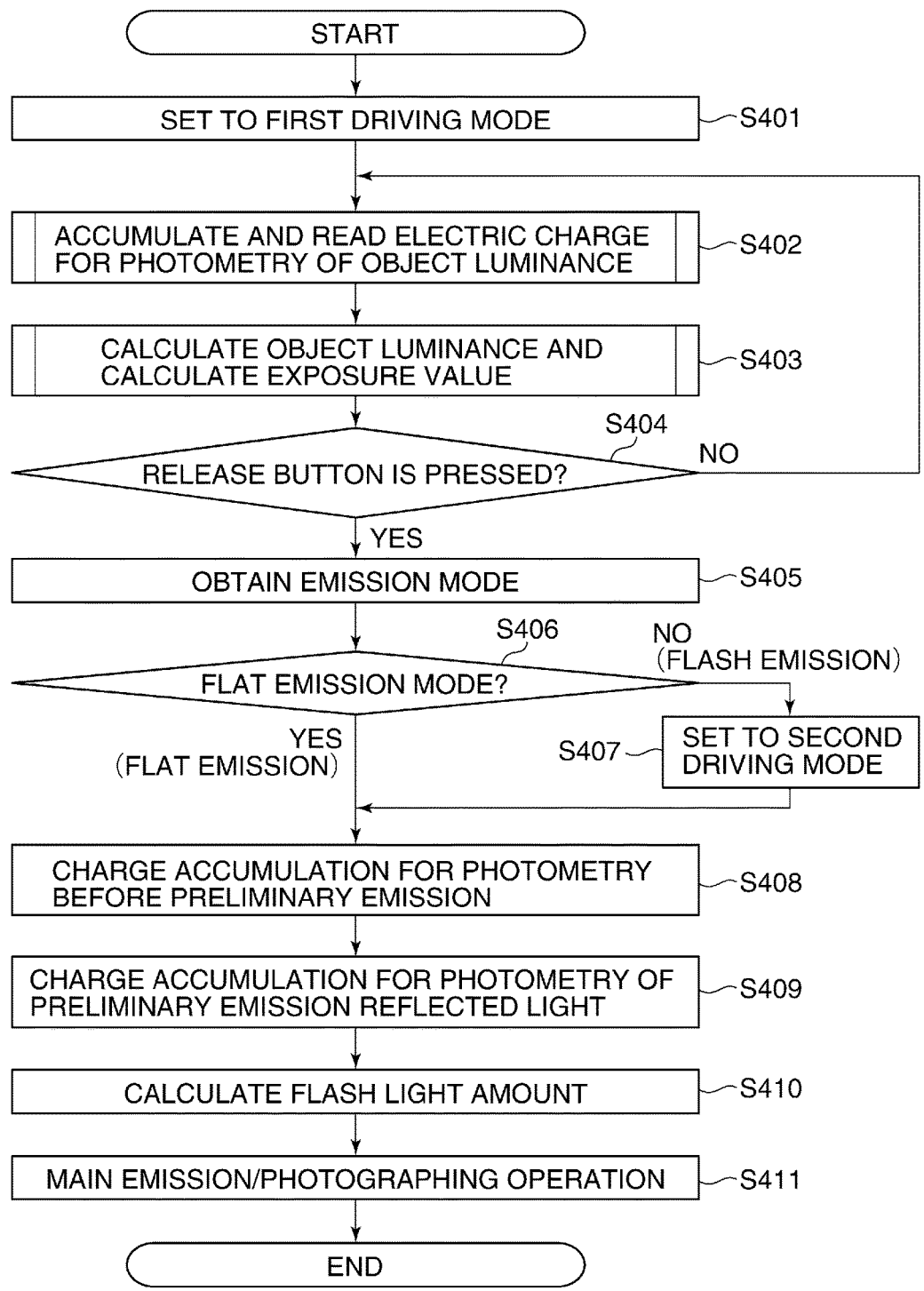
FIG. 8 is a flowchart showing a photographing operation according to the second embodiment in the image pickup apparatus.

Next, a second embodiment of the present invention will be described. FIG. 8 is a flowchart showing a photographing operation according to the second embodiment in the image pickup apparatus 100. Each process indicated by an S-number in the flowchart in FIG. 8 is achieved, when the CPU 30 runs a predetermined program and controls operations of parts of the image pickup apparatus 100.

Since processes in S401 through S404 are the same as that in S301 through S304 in the flowchart in FIG. 6, their descriptions are omitted. Since a preliminary emission mode may differ depending on the type of the electronic flash devices 3 attached, the CPU 30 obtains the preliminary emission mode of the electronic flash device 3 by communication with the electronic flash device 3 in S405. The CPU 30 determines whether the preliminary emission mode of the electronic flash device 3 obtained in S406 is a flat emission mode or a flash emission mode. When determining that the mode is the flat emission mode (YES in S406), the CPU 30 proceeds with the process to S408. When determining that the mode is the flash emission mode (NO in S406), the CPU 30 proceeds with the process to S407. The CPU 30 sets the driving mode of the photometry sensor 20 to the second driving mode in S407. Since processes in S408 through S411 are the same as that in S306 through S309 in the flowchart in FIG. 6, their descriptions are omitted.

It should be noted that the photometry sensor 20 was set to the first driving mode in S401. Accordingly, when the preliminary emission mode of the electronic flash device 3 is the flat emission mode (when the process proceeds to S408 from S406), the processes in S408 through S411 are performed while the photometry sensor 20 is in the first driving mode. In the meantime, when the preliminary emission mode of the electronic flash device 3 is the flash emission mode (when the process proceeds to S408 from S407), the processes in S408 through S411 are performed while the photometry sensor 20 is in the second driving mode.

Figure 9:
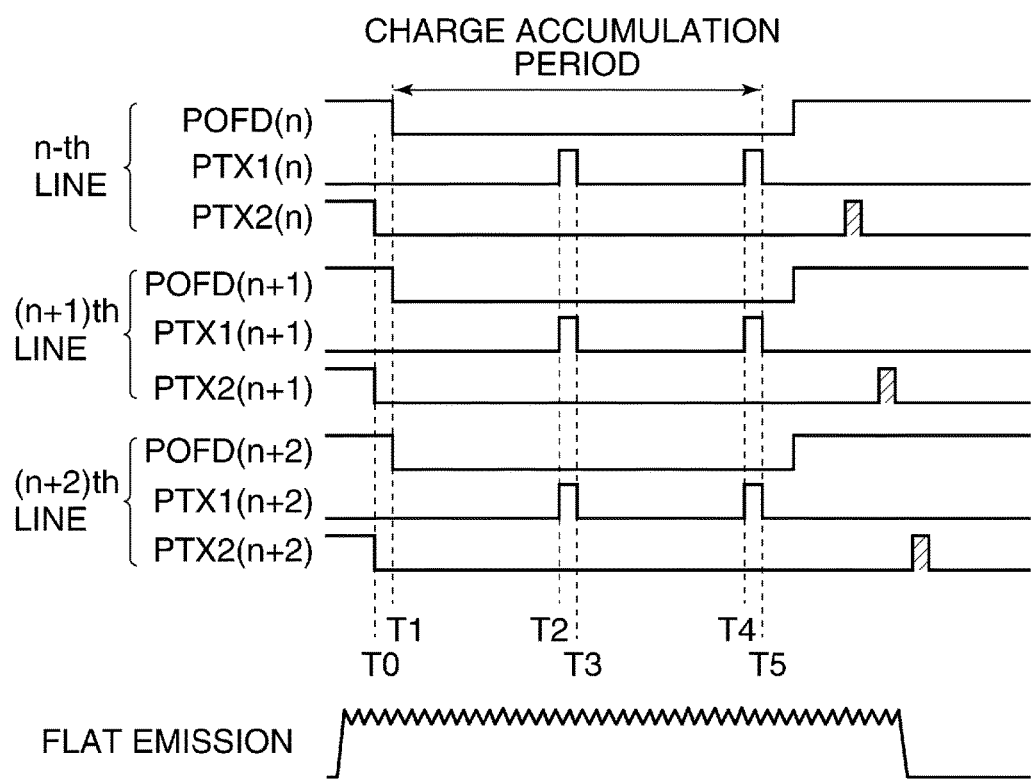
FIG. 9 is a timing chart for describing preliminary emission of an electronic flash device in a flat emission mode in a case where the photometry sensor is set to the first driving mode.

FIG. 9 is a timing chart for describing preliminary emission of the electronic flash device 3 in the flat emission mode in a case where the photometry sensor 20 is set to the first driving mode. Since the peak level of light in the flat emission mode is smaller than that in the flash emission mode, the possibility that the photoelectric conversion part PD will be saturated is smaller than that in the flash emission mode even in the first driving mode. In the meantime, the charge accumulation period of the photometry sensor 20 may become long because an emission period becomes long. Even in this case, the drive of the photometry sensor 20 in the first driving mode reduces the influence of dark current noise depending on the ON state period of the first transfer switch MTX1.

As mentioned above, the driving mode of the photometry sensor 20 is selected according to the preliminary emission mode of the electronic flash device 3 in the second embodiment. This enables the flash photographing in suitable main emission amount because the photometry accuracy increases, which enables to obtain a high-quality photographing image.

Figure 10:
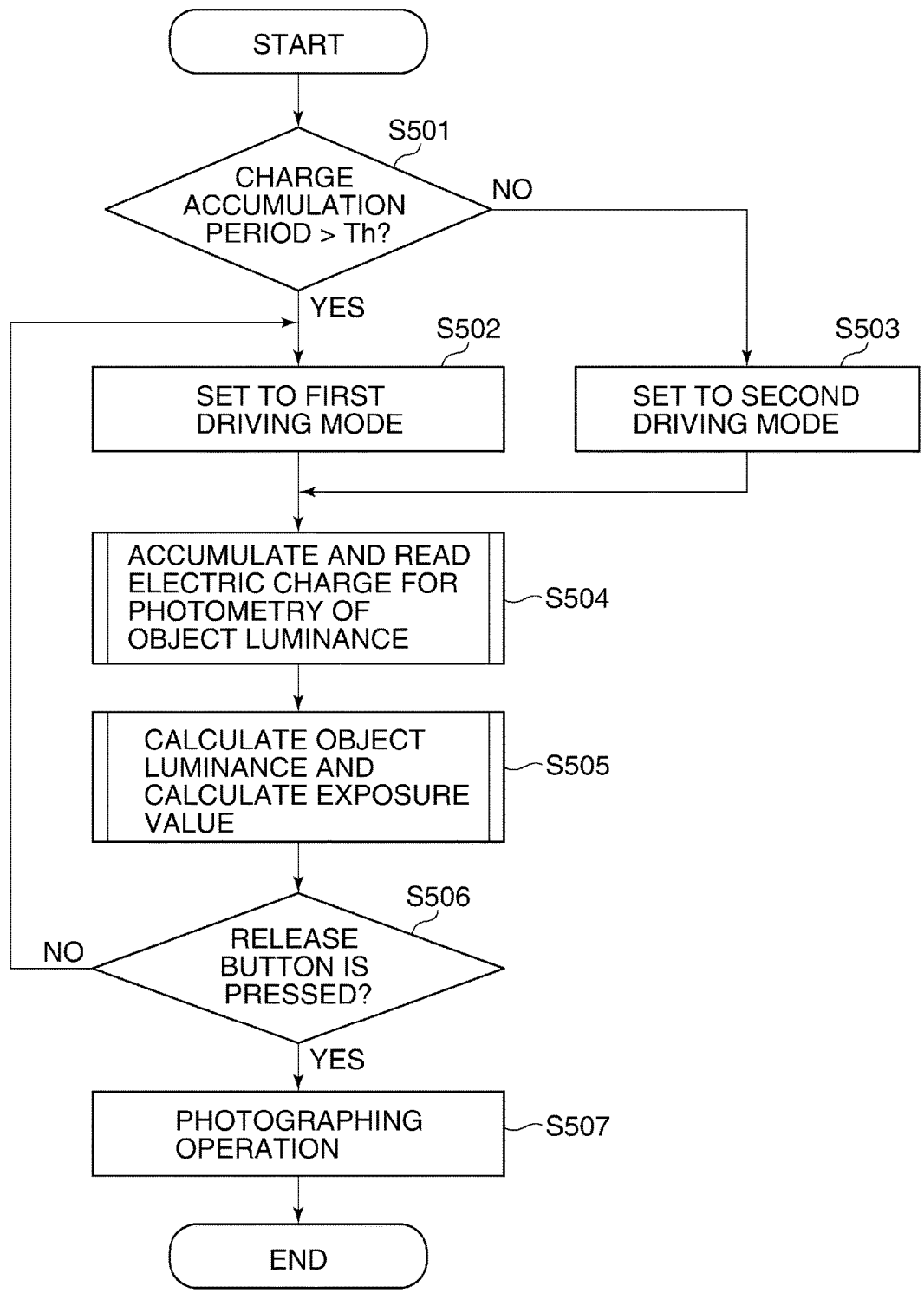
FIG. 10 is a flowchart showing a photographing operation according to a third embodiment in the image pickup apparatus.

Next, a third embodiment of the present invention will be described. FIG. 10 is a flowchart for describing a photographing operation according to the third embodiment in the image pickup apparatus 100. Each process indicated by an S-number in the flowchart in FIG. 10 is achieved, when the CPU 30 runs a predetermined program and controls operations of parts of the image pickup apparatus 100.

The CPU 30 determines whether the charge accumulation period of the photometry sensor 20 is longer than a predetermined threshold Th in S501. The charge accumulation period is determined on the basis of the object luminance obtained before executing the process in S501. If there is no object luminance obtained, a predetermined accumulation period is used. The threshold Th is set as a period during which the influence of the dark current noise depending on the ON state period of the first transfer switch MTX1 is disregardable, for example. When the charge accumulation period is longer than the threshold Th (YES in S501), the CPU 30 proceeds with the process to S502. When the charge accumulation period is not longer than the threshold Th (NO in S501), the CPU 30 proceeds with the process to S503.

The CPU 30 sets the driving mode of the photometry sensor 20 to the first driving mode in S502, and then, proceeds with the process to S504. The CPU 30 sets the driving mode of the photometry sensor 20 to the second driving mode in S503, and then, proceeds with the process to S504. Processes in S504 and S505 are the same as that in S302 and S303 in the flowchart in FIG. 6, their descriptions are omitted. The CPU 30 determines whether the release button provided in the camera body 1 is pressed for a start instruction of main photographing in S506. When determining that the release button is not pressed (NO in S506), the CPU 30 returns the process to S501. When determining that the release button is pressed (YES in S506), the CPU 30 proceeds with the process to S507. In S507, the CPU 30 controls the image sensor 14 and the shutter control circuit 26 on the basis of the exposure value calculated in S505, and executes the photographing operation. The CPU 30 finishes this process after the process in S507.

Figure 11A:
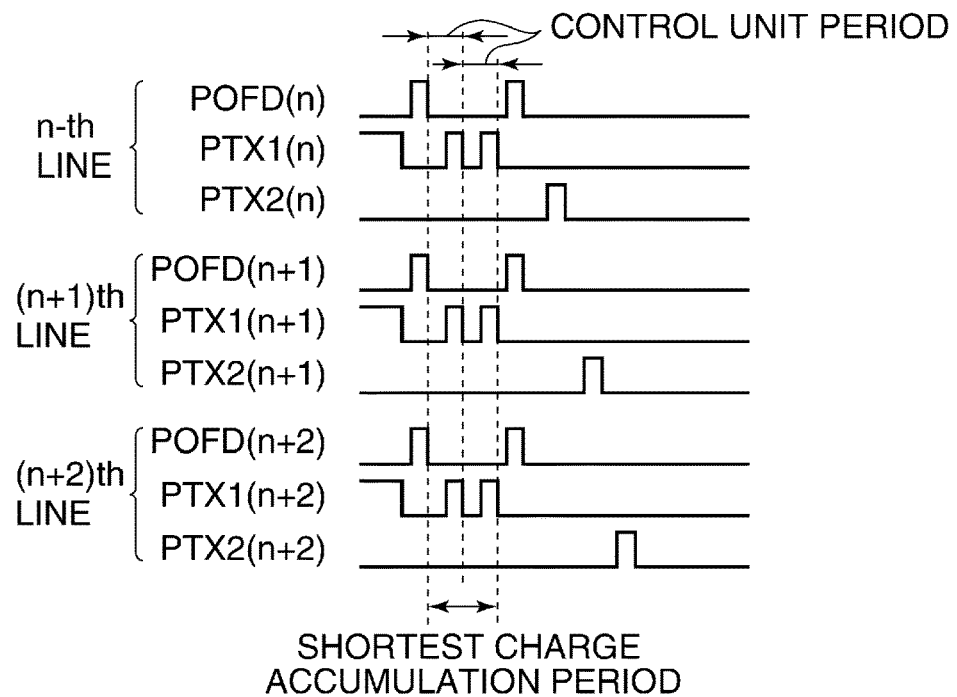
FIG. 11A is a view for describing a control unit period of the photometry sensor in the first driving mode.
Figure 11B:
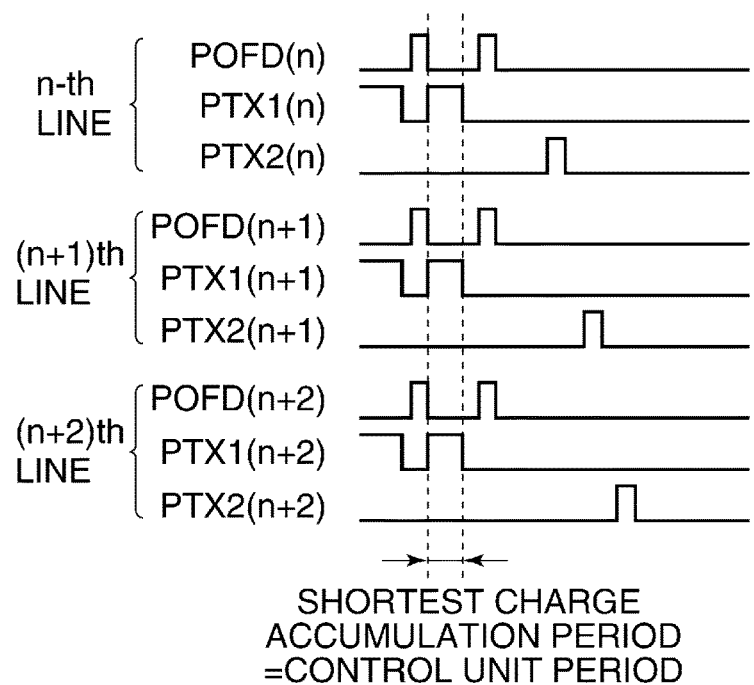
FIG. 11B is a view for describing a control unit period of the photometry sensor in the second driving mode.

FIG. 11A is a view for describing a control unit period of the photometry sensor 20 in the first driving mode. An available control unit period to the charge accumulation period in the photometry sensor 20 is restricted by the CPU 30 or the control unit 202 of the photometry sensor 20. In the first driving mode, since the first transfer switch MTX1 is needed to turn on and off twice at least during one set of charge accumulation, at least two control unit periods are necessary in order to maximally use the saturation charge amount of the charge accumulation part MEM. FIG. 11B is a view for describing a control unit period of the photometry sensor 20 in the second driving mode in the second driving mode, since the first transfer switch MTX1 is enough to turn on and off once during one set of charge accumulation, the charge accumulation period can be set such that one control unit period maximally uses the saturation charge amount of the charge accumulation part MEM. Accordingly, since the shortest charge accumulation period in the second driving mode is able to be half of the shortest charge accumulation period in the first driving mode, the high-luminance limit of photometry is doubled. Moreover, even if the driving mode is set to the second driving mode, since the charge accumulation period is short, the influence of the dark current noise depending on the ON state period of the first transfer switch MTX1 is reduced.

Figure 12:
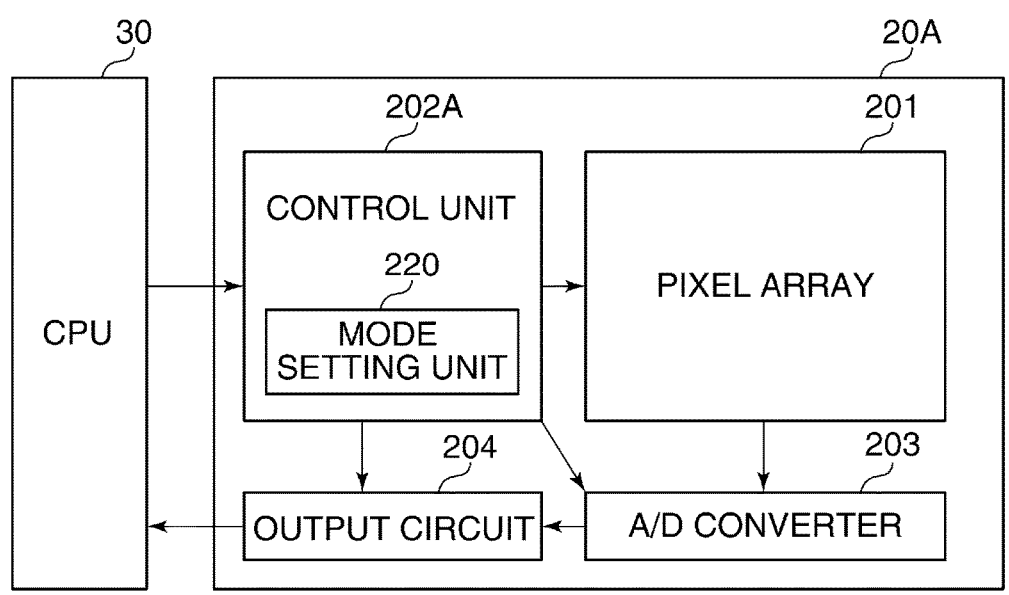
FIG. 12 is a block diagram showing a configuration of a photometry sensor in a fourth embodiment.

Next, a fourth embodiment of the present invention will be described. FIG. 12 is a block diagram showing an internal configuration of a photometry sensor 20A that is attachable to the image pickup apparatus 100. In the fourth embodiment, photometry control for determining an exposure value is performed using the photometry sensor 20A that is configured by changing the photometry sensor 20 used in the first, second, and third embodiments. It should be noted that components of the photometry sensor 20A that are the same as the components of the photometry sensor 20 are labeled by the same reference numerals and their descriptions are omitted.

The photometry sensor 20A is provided with the pixel array 201, a control unit 202A, the A/D converter 203, and the output circuit 204. The control unit 202A has a mode setting unit 220. When receiving a control instruction for setting the charge accumulation period from the CPU 30, the mode setting unit 220 selects and sets the driving mode of the photometry sensor 20A corresponding to the set-up charge accumulation period.

Figure 13:
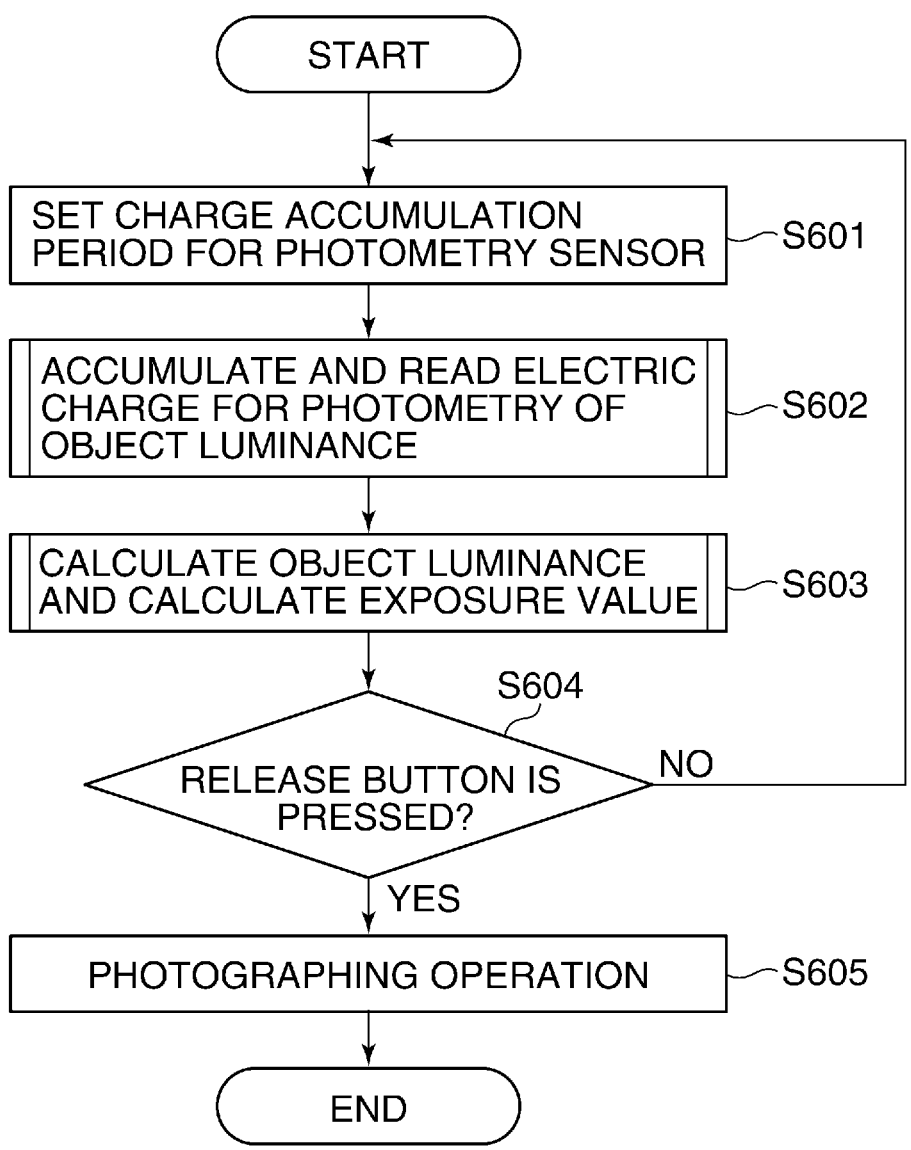
FIG. 13 is a flowchart showing a photographing operation in an image pickup apparatus according to the fourth embodiment.

FIG. 13 is a flowchart showing a photographing operation in the image pickup apparatus equipped with the photometry sensor 20A. Each process indicated by an S-number in the flowchart in FIG. 13 is achieved, when the CPU 30 runs a predetermined program and controls operations of parts of the image pickup apparatus 100.

The CPU 30 sets up the charge accumulation period to the photometry sensor 20A in S601. Thereby, in S601, the mode setting unit 220 of the photometry sensor 20A selects and sets the driving mode of the photometry sensor 20A corresponding to the set-up charge accumulation period by executing the processes in S501 through S503 in the flowchart in FIG. 10. Alternatively, the mode setting unit 220 may select and set the driving mode in S601 when receiving a flag for determining the preliminary emission mode of the electronic flash device 3 from the CPU 30. In this case, the control unit 202A executes the processes in S406 and S407 in the flowchart in FIG. 8.

Since processes in S602 through S604 are the same as that in S302 through S304 in the flowchart in FIG. 6, their descriptions are omitted. When the determination result in S604 is NO, the CPU 30 returns the process to S601 from S604. In S605, the CPU 30 controls the image sensor 14 and the shutter control circuit 26 on the basis of the exposure value calculated in S603, and executes the photographing operation. The CPU 30 finishes this process after the process in S605.

Since the control instruction from the CPU 30 is abstracted to the charge accumulation period or the emission mode flag of the electronic flash device 3 according to the fourth embodiment as mentioned above, there is no need to set various timings one by one for driving the pixel array 201. Thereby, the control instruction communication to the photometry sensor 20A is simplified, which improves the responsiveness in the photographing operation of the image pickup apparatus 100. Other Embodiments While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Furthermore, two or more embodiments may be combined suitably. The present invention is not limited to the configuration in which the photographing lens 2 and the electronic flash device 3 are detachable as described with reference to FIG. 1. For example, the present invention is applicable to an image pickup apparatus with an undetachable lens or a built-in electronic flash device. Moreover, the CPU 30 shall perform the AE process on the basis of the photometry result of the photometry sensor 20 in the abovementioned embodiments. However, the CPU 30 may perform the AE process on the basis of the photometry result obtained using the image sensor 14. Furthermore, the second embodiment and the third embodiment may be combined. Specifically, the driving mode of the photometry sensor is selectively switched corresponding to the charge accumulation period during the charge accumulation for photometry of the object luminance. Then, the driving mode of the photometry sensor 20 may be switched according to the preliminary emission mode of the electronic flash device 3 in the charge accumulation for photometry of the preliminary emission reflected light.

This application claims the benefit of Japanese Patent Application No. 2017-080709, filed Apr. 14, 2017, which is hereby incorporated by reference herein in its entirety.

What is claimed is:

1. An image pickup apparatus comprising:
   a controller; and
   an image pickup device comprising:
   a photoelectric conversion part configured to generate an electric charge by converting light incident on the photoelectric conversion part through a photographing lens, and to be able to accumulate the generated electric charge in the photoelectric conversion part;
   a charge accumulation part configured to hold an electric charge transferred from the photoelectric conversion part; and
   a transfer switch configured to transfer the electric charge from the photoelectric conversion part to the charge accumulation part,
   wherein the controller is configured to selectively set a driving mode from among a first driving mode in which the electric charge generated by the photoelectric conversion part is intermittently transferred to the charge accumulation part by switching ON and OFF of the transfer switch within a charge accumulation period and a second driving mode different from the first driving mode and in which the electric charge generated by the photoelectric conversion part is continuously transferred to the charge accumulation part by keeping an ON state of the transfer switch, instead of switching the transfer switch ON and OFF as in the first driving mode, within the charge accumulation period.

2. The image pickup apparatus according to claim 1, wherein a saturation charge amount of the charge accumulation part is larger than a saturation charge amount of the photoelectric conversion part.

3. The image pickup apparatus according to claim 1, further comprising a light emission device,
   wherein the controller sets the image pickup device to the first driving mode in a case where luminance of an object is found without emission of the light emission device, and
   wherein the controller sets the image pickup device to the second driving mode in a case where photometry of reflected light from the object is performed with emission of the light emission device.

4. The image pickup apparatus according to claim 3, wherein the controller controls the image pickup device so as to perform photometry of the reflected light from the object with emission of the light emission device after photometry of the light from the object without emission of the light emission device in a state where the image pickup device is set to the second driving mode, and calculates a light emission amount of the light emission device in main photographing based on two photometry results obtained.

5. The image pickup apparatus according to claim 1, further comprising a light emission device,
   wherein the controller sets the image pickup device to the first driving mode in a case where luminance of an object is found without emission of the light emission device and in a case where photometry of reflected light from the object is performed with flat emission of the light emission device, and
   wherein the controller sets the image pickup device to the second driving mode in a case where photometry of reflected light from the object is performed with flash emission of the light emission device.

6. The image pickup apparatus according to claim 1, wherein the controller sets the image pickup device to the first driving mode in a case where the charge accumulation period in the photoelectric conversion part is longer than a predetermined threshold, and
   wherein the controller sets the image pickup device to the second driving mode in a case where the charge accumulation period is not longer than the threshold.

7. An image pickup device comprising:
   a photoelectric conversion part configured to generate an electric charge by converting light incident on the photoelectric conversion part, and to be able to accumulate the generated electric charge in the photoelectric conversion part;
   a charge accumulation part configured to hold an electric charge transferred from the photoelectric conversion part;
   a transfer switch configured to transfer the electric charge from the photoelectric conversion part to the charge accumulation part; and
   a controller configured to selectively set a driving mode from among a first driving mode in which the electric charge generated by the photoelectric conversion part is intermittently transferred to the charge accumulation part by switching ON and OFF of the transfer switch within a charge accumulation period and a second driving mode different from the first driving mode and in which the electric charge generated by the photoelectric conversion part is continuously transferred to the charge accumulation part by keeping an ON state of the transfer switch, instead of switching the transfer switch ON and OFF as in the first driving mode, within the charge accumulation period.

8. A control method for an image pickup apparatus equipped with an image pickup device that includes a photoelectric conversion part that generates an electric charge by converting light incident on the photoelectric conversion part and is able to accumulate the generated electric charge in the photoelectric conversion part, a charge accumulation part that holds an electric charge transferred from the photoelectric conversion part, and a transfer switch that transfers the electric charge from the photoelectric conversion part to the charge accumulation part, the control method comprising:
   setting a driving mode from among a first driving mode and a second driving mode different from the first driving mode selectively;
   transferring, in the first driving mode, the electric charge generated by the photoelectric conversion part to the charge accumulation part intermittently by switching ON and OFF of the transfer switch within a charge accumulation period; and transferring, in the second driving mode, the electric charge generated by the photoelectric conversion part to the charge accumulation part continuously by keeping an ON state of the transfer switch, instead of switching the transfer switch ON and OFF as in the first driving mode, within the charge accumulation period.

9. A control method for an image pickup device that includes a photoelectric conversion part that generates an electric charge by converting light incident on the photoelectric conversion part and is able to accumulate the generated electric charge in the photoelectric conversion part, a charge accumulation part that holds an electric charge transferred from the photoelectric conversion part, and a transfer switch that transfers the electric charge from the photoelectric conversion part to the charge accumulation part, the control method comprising:

setting a driving mode from among a first driving mode and a second driving mode different from the first driving mode selectively;

transferring, in the first driving mode, the electric charge generated by the photoelectric conversion part to the charge accumulation part intermittently by switching ON and OFF of the transfer switch within a charge accumulation period; and transferring, in the second driving mode, the electric charge generated by the photoelectric conversion part to the charge accumulation part continuously by keeping an ON state of the transfer switch, instead of switching the transfer switch ON and OFF as in the first driving mode, within the charge accumulation period.

* * * * *